United States Patent Office 3,459,671
Patented Aug. 5, 1969

3,459,671
POLYURETHANE PRECURSOR COMPOSITION CONTAINING AN ORGANIC HALOGEN AND TRIALKANOLAMINE
Raymond Joseph Marklow and John Francis Wood, Manchester, England, assignors to Imperial Chemical Industries Limited, London, England, a corporation of Great Britain
No Drawing. Filed Apr. 27, 1966, Ser. No. 545,552
Claims priority, application Great Britain, May 4, 1965, 18,732/65
Int. Cl. C09k 3/00, 3/28; C08g 22/00
U.S. Cl. 252—182                                6 Claims

ABSTRACT OF THE DISCLOSURE

A mixture of an organic halogen compound and a trialkanolamine having a combined mono- and dialkanolamine content expressed as dialkanolamine, less than 5 weight percent based on the weight of the trialkanolamine and a method for preparing the mixture for use in preparing a polyurethane foam which includes reacting a trialkanolamine containing mono- and dialkanolamine with alkylene oxide in amounts sufficient to react substantially with the mono- and dialkanolamines to provide a trialkanolamine having a mono- and dialkanolamine content, expressed as dialkanolamine, less than 5 weight percent based on said trialkanolamine and mixing the resulting trialkanol amine with an organic halogen compound.

---

This invention relates to trialkanolamines and particularly to the removal of primary and secondary amino impurities therefrom.

Trialkanolamines are normally manufactured by reacting alkylene oxides with ammonia. In addition to trialkanolamine formed by the reaction of three moles of alkylene oxide with one mole of ammonia, the reaction product contains minor amounts of dialkanolamine and monoalkanolamine formed by the reaction of two moles and one mole, respectively, of alkylene oxide with one mole of ammonia. These impurities may be removed by fractional distillation but this is not particularly conventional since the alkanolamines are high boiling materials and are liable to decomposition at high temperatures. Accordingly, the trialkanolamines which are commercially available usually contain significant amounts of di- and monoalkanolamines. Thus, for example, the commercial grade of triethanolamine commonly contains about 83–85% of pure triethanolamine, about 15% of diethanolamine and about 1 or 2% monoethanolamine. Commercial tri-isopropanolamine may contain approximately similar proportions of impurities.

For many purposes the presence of di- and monoalkanolamines in the trialkanolamine is of negligible importance since all three are weakly basic, water-soluble, high boiling materials. For some purposes, however, the presence in trialkanolamines of mono- and dialkanolamines with their highly reactive primary and secondary amino groups is undesirable. It has been found, for example, that solutions of commercial trialkanolamines in organic halogen compounds, particularly compounds in which one or more halogen atoms are attached to aliphatic carbon atoms, are unstable, solid matter being precipitated during storage. In the case of organic chlorine compounds, it appears that the precipitate is a trialkanolamine hydrochloride. This is of considerable practical importance since trialkanolamines are commonly employed as cross-linking agents in polyurethane foam formulations and, for convenience, blends are often prepared containing the trialkanolamine with a volatile organic halogen compound such as trichlorofluoromethane, used as blowing agent, and a high boiling organic halogen compound such as tris-2-chloroethyl phosphate, used as fire-retarding agent. It is frequently found that crystalline deposits are formed in these blends before they are mixed with other polyurethane foam ingredients. This can have serious consequences since solid materials may cause the blocking of jets in polyurethane foam dispensing machines and, in any case, the use in polyurethane foam manufacture of blends of materials of somewhat doubtful constitution is always undesirable because of the delicacy of the foaming process. This deposition of solid is accelerated by the presence of metallic copper, often taking place in a few hours. Thus, machines containing copper or brass parts can be very easily blocked if these mixtures stand in them. The present invention provides a process whereby the mono- and dialkanolamine contents of commercial trialkanolamines may be reduced and the difficulties referred to above obviated or minimised.

Thus, according to the present invention, there is provided a process for producing trialkanolamines having improved properties which comprises treating a trialkanolamine containing minor proportions of dialkanolamine and/or monoalkanolamine with an agent which reacts with secondary and primary amino groups, said treatment being continued until the combined mono- and dialkanolamine content, expressed as dialkanolamine, is less than 5% by weight of the treated mixture.

Preferably the treatment is continued until the combined mono- and dialkanolamine content is less than 1% by weight of the treated mixture. The nature of the treatment usually ensures that the monoalkanolamine content is much lower than the dialkanolamine content but, for analytical reasons, it is convenient to express these as a combined figure.

Agents which react with secondary and primary amino groups are well known and may be broadly classified as alkylating and acylating agents.

Suitable alkylating agents are agents which react with primary and secondary amines in such a way as to replace the nitrogen-bound hydrogen atoms by alkyl or substituted alkyl groups. Such agents include alkyl and aralkyl halides, for example ethyl iodide and benzyl chloride, vinyl compounds, for example vinyl acetate, ethyl acrylate, methyl methacrylate, acrylonitrile and acrylamide and alkylene oxides, for example ethylene oxide, propylene oxide, butylene oxides and epichlorohydrin.

Suitable acylating agents are agents which react with primary and secondary amines forming amide groupings. Such agents include ketene, diketene, carboxylic acids, for example formic and acetic acids, acid anhydrides, for example acetic anhydride, acid esters, for example ethyl acetate, halides of organic or inorganic acids, for example acetyl chloride, benzoyl chloride, benzenesulphonyl chloride and thionyl chloride, and organic isocyanates.

It is preferred to use agents which, in reacting with the primary and secondary amino groups, do not produce unwanted by-products which need to be removed by a further proces step such as filtration.

Of course, agents which react with primary and secondary amino groups are, in general, also reactive towards hydroxyl groups and therefore, during treatment of the trialkanolamine, some reaction may take place at the hydroxyl groups of the alkanolamines. However, the reactivity of primary and secondary amino groups towards such agents is generally so much greater than the reactivity of hydroxyl groups that the small amount of reaction taking place at the hydroxyl groups is not a serious embarrassment. In some cases, however, for example where the trialkanolamine is to be used as a cross-linking agent in polyurethane formulations, it is important that there should be no significant reduction in the hydroxyl functionality of the trialkanolamine. In these cases, alkylene oxides have been found to be particularly suitable agents with which to treat the crude trialkanolamine since the cross-linking potentialities of the mixture are not adversely affected thereby.

Analytical methods for the determination of primary and secondary amines are well-known and accordingly it is a simple matter to determine the amount of mono- and dialkanolamines present in the trialkanolamine before and after treatment but naturally when the mono- and dialkanolamine contents have been reduced to very low levels some methods of estimation, e.g. separation by precision distillation, are not convenient. The extent of any treatment can, however, be followed by measuring the equivalent weight of the mixture by titration with suitable strong acid. In operating the process of the present invention the trialkanolamine is usually treated with an amount of agent that is approximately stoichiometrically equivalent to the amount of mono- and dialkanolamines present therein or by a suitable excess when the reagent is easily removed, e.g. lower alkyl iodides or when the reaction of excess reagent with hydroxyl groups does not reduce the hydroxyl functionality, e.g. alkylene oxides. The conditions of the treatment may be those generally employed for the particular class of agent concerned. Thus, for example, where the agent is an alkylene oxide, temperatures of from 50° C. to 150° C., preferably from 90° C. to 120° C. and pressures of up to 80 pounds per square inch may conveniently be employed. In other cases, for example where the agent is an organic isocyanate, treatment at room temperature may be more suitable.

In the case where a commercial triethanolamine is treated with an alkylene oxide such as ethylene or propylene oxide, it is suitable to continue the treatment until the product has an equivalent weight of from 150 to 180, preferably from 150 to 165.

If desired, the treated trialkanolamines may be further reacted with alkylene oxides, optionally in the presence of basic catalysts, so as to produce polyethers suitable for use in polyurethane processes.

Trialkanolamines treated according to the process of the present invention are found to be much more suitable for use in admixture with organic halogen compounds, particularly compounds in which one or more halogen atoms are attached to aliphatic carbon atoms, than are the normal commercially available trialkanolamines. In particular it is found that the tendency of such mixtures to form crystalline deposits is much reduced when the treated trialkanolamines are used in place of commercial trialkanolamines.

Thus, according to a further embodiment of the present invention, there are provided mixtures containing at least one trialkanolamine and at least one organic halogen compound characterized in that the trialkanolamine used is obtained by treating a trialkanolamine containing minor proportions of dialkanolamine and/or monoalkanolamine with an agent which reacts with secondary and primary amino groups, said treatment being continued until the combined mono- and dialkanolamine content, expressed as dialkanolamine, is less than 5% by weight of the treated mixture.

Mixtures of particular value are mixtures which include the treated trialkanolamine, particularly triethanolamine, and halogenated hydrocarbons having boiling points not exceeding 75° C. at atmospheric pressure and/or organic halogen compounds having boiling points greater than 150° C. at atmospheric pressure. The halogenated hydrocarbons having boiling points not exceeding 75° C. are commonly employed as blowing agents in the manufacture of polyurethane foams and include such compounds as methylene chloride, trichlorofluoromethane, dichloromonofluoromethane and dichlorotetrafluoroethane. The organic halogen compounds having boiling points greater than 150° C. are commonly employed as flame-proofing agents in the manufacture of polyurethane foams are suitably compounds containing at least 10%, preferably at least 30% by weight of halogen, for example tris-2-chloroethyl phosphate, tris chloropropyl phosphate, tris-2,3-dibromopropyl phosphate and 2,3-dibromopropanol.

Such mixtures may be used in the manufacture of polyurethane foams from polyhydroxy compounds and polyisocyanates using the general methods fully described in the prior art. The polyhydroxy compounds, for example, polyethers or polyesters, may, if desired, be included in the said mixtures.

The invention is illustrated but not limited by the following examples in which all parts are by weight:

Example 1

3040 parts of a commercial triethanolamine (containing about 8% of diethanolamine and having an equivalent weight of 146) are charged to a 1 gallon stainless steel reactor heated to 100° C. and 400 parts of propylene oxide are added over ½ hour at pressures up to 20 p.s.i. The mix is maintained at 100° C. for 1 hour then any excess removed by applying a water pump vacuum for ½ hour.

The product is a very pale yellow liquid with an equivalent weight of 163 and contains no detectable mono- or diethanolamine.

The product was compared with the starting material in the following mixture:

| | Parts |
|---|---|
| Triethanolamine | 15 |
| Trichlorofluoromethane | 55 |
| Water | 2 |
| Tris-2-chloroethyl phosphate | 30 |

A strip of copper foil was placed in the mixture. The mixture containing the commerical triethanolamine showed a bright blue colour within the first ½ hour and after 18 hours the mixture was solid with crystals. The treated material took 18 hours to show a faint blue colour and had deposited no crystals until 42 hours had elapsed.

Example 2

2275 parts of a commercial triethanolamine (containing 2% of monoethanolamine and 11% of diethanolamine and having an equivalent weight of 140) are treated as in Example 1 with 310 parts of propylene oxide. The product is a very pale straw-coloured liquid having an equivalent weight of 159 and a combined mono- and diethanolamine content of 1.3% expressed as diethanolamine.

When put through the test given in Example 1 the same large difference between treated and untreated material was observed as in Example 1 but in both cases the decomposition was marginally faster.

Example 3

The following mixture was made up with various triethanolamines and heated to 80° C. for 16 hours. The amount of decomposition was assessed by measuring the ionic chlorine contents.

| | Parts |
|---|---|
| Oxypropylated trimethylolpropane (mol. weight 310) | 100 |
| Tris($\beta$-chloroethyl)phosphate | 15 |
| Water | 2 |
| Triethanolamine | 30 |

| Triethanolamine used: | Ionic chlorine (percent) |
|---|---|
| None | 0.06 |
| Commercial triethanolamine as used in Example 1 | 0.26 |
| Commercial triethanolamine as used in Example 2 | 0.39 |
| Product of Example 2 | 0.08 |

We claim:

1. A process for preparing a mixture of a trialkanolamine and an organic halogen compound having a halogen content of at least 30 weight percent for use in preparing a polyurethane foam, said organic halogen compound being selected from the group consisting of methylene chloride, trichlorofluoromethane, dichloromonofluoromethane, dichlorotetrafluoroethane, tris-2-chloroethyl phosphate, tris chloropropyl phosphate, tris-2,3-dibromopropyl phosphate and 2,3-dibromopropanol, comprising the steps of reacting at a temperature ranging between 50–150° C. a trialkanolamine containing a member selected from the group consisting of mono- and dialkanolamine in an amount, expressed as dialkanolamine, greater than 5 weight percent with an alkylene oxide selected from the group consisting of ethylene oxide and propylene oxide in an amount and for a time sufficient to provide a trialkanolamine wherein the amount of said member, expressed as dialkanolamine, is less than 5 weight percent based on said trialkanolamine and mixing the resulting trialkanolamine with said organic halogen compound.

2. The process of claim 1 wherein the alkylene oxide is present in amounts sufficient to provide a trialkanolamine having less than 1 weight percent of said member expressed as dialkanolamine.

3. The process of claim 1 wherein the resulting trialkanolamine has an equivalent weight of from 150 to 180.

4. The process of claim 3 wherein the resulting trialkanolamine has an equivalent weight of from 150 to 165.

5. The process of claim 1 wherein the alkylene oxide is present in an amount substantially stoichiometrically equivalent to the amount of said member in the trialkanolamine.

6. A mixture for use in preparing a polyurethane foam of an organic halogen compound having a halogen content of at least 30 weight percent and being selected from the group consisting of methylene chloride, trichlorofluoromethane, dichloromonofluoromethane, dichlorotetrafluoroethane, tris-2-chloroethyl phosphate, tris chloropropyl phosphate, tris-2,3-dibromopropyl phosphate and 2,3-dibromopropanol, and a trialkanolamine having a combined mono- and dialkanolamine content, expressed as dialkanolamine, less than 5 weight percent based on the weight of the trialkanolamine, said trialkanolamine being the reaction product of a trialkanolamine containing a member selected from the group consisting of mono- and dialkanolamine in an amount, expressed as dialkanolamine, greater than 5 weight percent with an alkylene oxide selected from the group consisting of ethylene oxide and propylene oxide in an amount sufficient to provide said trialkanolamine wherein the amount of said member, expressed as dialkanolamine, is less than 5 weight percent based on said trialkanolamine, said mixture containing from 15 to 170 parts by weight of said organic halogen compound for each 30 parts by weight of said trialkanolamine.

References Cited

UNITED STATES PATENTS 2,649,483  8/1953  Huscher et al. _____ 260—584

LEON D. ROSDOL, Primary Examiner

I. GLUCK, Assistant Examiner

U.S. Cl. X.R.

252—8; 260—2, 45, 75, 77